UNITED STATES PATENT OFFICE.

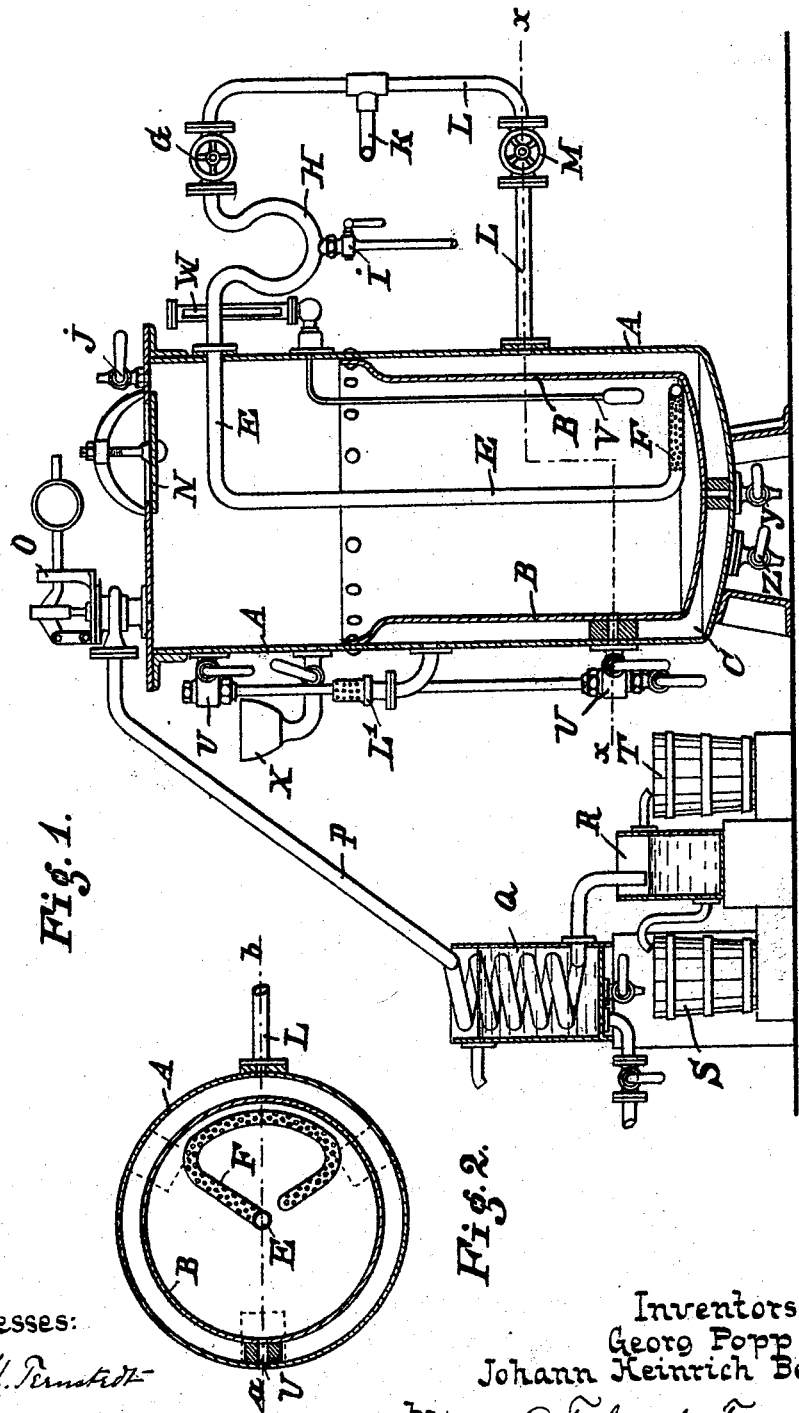

GEORG POPP AND JOHANN HEINRICH BECKER, OF FRANKFORT-ON-THE-MAIN, GERMANY.

METHOD OF STERILIZING BY STEAM.

SPECIFICATION forming part of Letters Patent No. 516,509, dated March 13, 1894.

Application filed April 11, 1893. Serial No. 469,943. (No specimens.)

*To all whom it may concern:*

Be it known that we, GEORG POPP and JOHANN HEINRICH BECKER, subjects of the Emperor of Germany, and residents of Frankfort-on-the-Main, Germany, have invented new and useful Improvements in Methods of and Apparatus for Sterilizing by Steam, of which the following is a specification.

This invention relates to a process for sterilizing liquids, more especially milk, in large quantities and without the detrimental effects consequent to the present mode of sterilization, which is effected by externally heating receptacles containing the liquid. In the case of milk this mode of treatment renders the same unpalatable probably due to its being locally overheated, which cannot be entirely avoided, even by careful agitation. Sterilization by the direct introduction of steam into the liquid has not been hitherto attempted for fear of imparting an objectionable taste to, and of diluting the liquid. The sterilization of milk on a large scale has not been generally successful because the milk has either been excessively heated thus causing it to change color and acquire a disagreeable flavor, or it has been insufficiently heated and consequently imperfectly sterilized. The process by which the disagreeable flavor is removed, viz. by passing sterilized air through the sterilized milk, is very complicated and also unreliable.

Our process consists in first heating the milk to the boiling point, or nearly so, and then introducing steam into the liquid,—the external heating being meanwhile continued.

In carrying out the invention, the steam is introduced preferably at the bottom of the liquid in a number of small jets so directed that the steam thoroughly permeates the liquid and sets up a rapid circulation. The whole of the milk particles are thus brought expeditiously into intimate contact with the steam and sterilized, while the danger of local overheating which caramelizes the milk sugar or otherwise gives rise to a disagreeable boiled taste is avoided. When steam is introduced into the liquid and the external heating thereof properly effected, no condensation takes place, or, at any rate, so little that it has no appreciable effect. For instance, we have found that after operating with steam for a period of thirty-five minutes the milk was only diluted to the extent of about three per cent. The process, however, might be objected to on the ground that the fatty constituents of the milk are distilled off by the passage through it of the steam, but this loss has been determined and compared favorably with other known processes for sterilizing milk. But, in any case, the fatty substance carried off with the steam can be readily recovered by condensation in a cooling coil so as to constitute a valuable substance which may be readily turned to account and materially reduce the working costs of the process. In the preservation of other substances, such as meat, soup and fruit preserves, &c., this invention enables other constituents, such as fatty acids, fruit acids, &c., to be recovered. By directly boiling with steam the original taste, odor and appearance of the liquids treated are retained without necessitating additional aeration with specially sterilized inert gases,—while by means of this process,—in order to insure the annihilation of germs, the sterilizing operation can be continued for a much longer period without detriment to the quality, and without being in any way limited to the quantity of liquid to be operated on. According to this process the heating of the liquid is effected in a jacketed container or other indirectly heated vessel until it attains the temperature of the steam, whereupon the latter is at once introduced into the liquid, which latter is thus energetically agitated. The indirect heating and the introduction of steam are continued until the completion of the process, whereupon the sterilized liquid is charged into vessels which have been previously sterilized by the introduction of steam. If it be desired to thicken the liquid this is effected with the aid of a vacuum, special importance being attached to the fact that this inspissation under a vacuum in presence of steam can be carried out concurrently with, or subsequently to the sterilization, and in the same, or in similar apparatus connected thereto. The passage of steam during the inspissation affords protection, particularly in the case of milk, against decomposition of the chemical constituents of the substance treated.

In carrying out our invention we use by preference apparatus such as illustrated in the accompanying drawings, in which—

Figure 1 represents a sectional elevation

Fig. 2 is a horizontal section in the plane x x Fig. 1.

Similar letters of reference designate corresponding parts throughout both views of the drawings.

Referring to the drawings, the apparatus consists of a closed vessel A having an inner container B;—a steam-tight space or chamber C, being left between the two. A steam supply pipe E is introduced at the upper part of the vessel and extends down close to the bottom of the container at one side where it terminates preferably in a bent part F, which is perforated with numerous holes,—its other end being attached to the steam pipe H. The steam pipe is provided with a regulating stop-valve G, and it is either bent and provided with a blow off cock I, or furnished with a usual form of steam trap. Steam is introduced into the space or jacket C by a pipe connected with the steam main K, and the apparatus is provided with a man-hole N in the cover for enabling the vessel to be cleaned out, there being provided also a safety valve O, and an inlet-cock J, for the admission of germ-pure air during the emptying of the apparatus. A pipe P conveys the steam from the upper part of the vessel to a cooling coil Q, which leads into a separating vessel R, so that when fatty liquids such as milk, &c., are being sterilized (the water and fatty matter being then separated by gravity) the water is caught in one vessel S and the fatty substance in another T. A water gage U is attached to the vessel for observing the rise of the liquid undergoing sterilization when steam is introduced and during the indirect heating thereof, and its fall on completion of the operation, and also any addition to the quantity of liquid due to condensation. A thermometer V is suspended within the vessel and its stem passes out and is attached to the exterior of the vessel in order that its indications may be observed at W. The apparatus is furthermore provided with a funnel X for feeding in the liquid to be sterilized and with a cock Y for drawing off the sterilized charge. A cock Z is attached to the bottom of the apparatus for draining off the water of condensation from the steam jacket C, or in lieu of this a pipe connected with a steam trap may be employed. The steam-jacket is also provided with a combined exhaust and safety-valve L'.

We will now proceed to describe our process with reference to the apparatus shown. The liquid to be sterilized having been run into the vessel A steam is slowly admitted to the steam-jacket, and, when the thermometer V indicates that the liquid has attained approximately the sterilizing temperature, or the temperature of the steam to be introduced into it, the inlet valve M is opened and the steam is conveyed directly into the liquid through the perforated pipe E F, preferably in an oblique direction for the purpose of promoting the circulation. This energetically agitates the whole body of liquid and while thoroughly heating the liquid and destroying the germs, prevents its being locally overheated. By carefully observing the thermometer and the temperature of the steam-jacket, the temperatures can be so regulated that no condensation of the steam introduced, with consequent dilution of the liquid, takes place.

Any usual form of vacuum pump is attached to the apparatus if it be desired to employ it for inspissating or concentrating liquids during or after their sterilization. The steam-jacket for indirectly heating the liquid may of course be replaced by a heater such as a steam coil or the like placed within the container, or by a direct heating contrivance whose action can be profitably transferred immediately to a liquid. The contrivances for indirectly heating may, after the sterilizing, of course be used for rapidly cooling the liquids by the passage through them of cold water, &c. To promote the circulation of the liquid caused by the direct introduction therein of the steam, the container may be provided with gills or blades on its walls.

It is to be understood that sterilizing by the process of our invention may be effected in portable vessels and the sterilization may be carried out by introducing a steam-pipe into large milk cans and placing these in a water bath or the like.

What we claim as new, and desire to secure by Letters Patent, is—

1. The herein described process for sterilizing milk and other liquids, consisting in first heating the liquid by indirect heat to approximately the temperature necessary for sterilization and then passing steam through the liquid.

2. The herein described process for sterilizing milk and other liquids consisting in first heating the liquid by indirect heat to substantially the temperature necessary for sterilization, and then passing steam through the liquid under continued application of indirect heat to the liquid.

3. An apparatus for sterilizing liquids, consisting of a vessel A provided with a container B in its lower portion serving as a receptacle for the liquid to be sterilized, a steam jacket formed between the vessel and container for heating the liquid, a pipe E for the introduction of steam near the bottom of the container, a pipe P, for the escape of the steam from the upper part of the vessel A, a condenser in connection with pipe P, and separating vessels, substantially as described.

In testimony whereof we have signed our names to this specification in the presence of two subscribing witnesses.

GEORG POPP.
JOHANN HEINRICH BECKER.

Witnesses:
ALVESTO S. HOGUE,
JEAN GRUND.